United States Patent [19]

Carmon

[11] Patent Number: 4,937,745
[45] Date of Patent: Jun. 26, 1990

[54] METHOD AND APPARATUS FOR SELECTING, STORING AND DISPLAYING CHINESE SCRIPT CHARACTERS

[75] Inventor: Amiram Carmon, Jerusalem, Israel

[73] Assignee: United Development Incorporated, Panama City, Panama

[21] Appl. No.: 130,315

[22] Filed: Dec. 8, 1987

[30] Foreign Application Priority Data

Dec. 15, 1986 [GB] United Kingdom ............... 8629908

[51] Int. Cl.⁵ .............................................. G06F 15/38
[52] U.S. Cl. ................................... 364/419; 364/900; 400/110
[58] Field of Search ............................... 400/100–111; 364/419, 200, 900; 340/707, 708

[56] References Cited

U.S. PATENT DOCUMENTS

| 4,454,417 | 6/1989 | May | 340/707 |
| 4,484,305 | 11/1984 | Ho | 364/900 |
| 4,490,607 | 12/1989 | Pease et al. | 340/707 |
| 4,545,023 | 10/1985 | Mizzi | 364/900 |
| 4,698,758 | 10/1987 | Larsen | 364/419 |
| 4,839,634 | 6/1989 | Moore et al. | 340/707 |

Primary Examiner—Jerry Smith
Assistant Examiner—Kimthanh T. Bui
Attorney, Agent, or Firm—Browdy and Neimark

[57] ABSTRACT

A method and apparatus for selecting and storing script characters, particularly Chinese, in a computerized system containing a memory wherein is stored a database of such script characters. The database may be augmented by a user and is indexed according to the phonetic and graphic attributes of the script characters therein, so that by specifying at least one attribute, all characters in the database having the specified attribute may be identified. In a preferred embodiment only a few identified characters are displayed, and more attributes are specified by the user until the desired character is displayed. The apparatus includes a high resolution display monitor for displaying the characters and a specially adapted light pen provided with at least two selection switches for selecting a desired character or, alternatively, for displaying further identified characters according to which selection switch is operated.

18 Claims, 7 Drawing Sheets

METHOD AND APPARATUS FOR SELECTING, STORING AND DISPLAYING CHINESE SCRIPT CHARACTERS

BACKGROUND OF THE INVENTION

This invention relates to a method and apparatus for selecting, storing and displaying Chinese script characters such as are used not only in the Chinese language but also extensively in the Japanese and Korean languages. The references hereafter to the Chinese language should be taken as including all other languages wherein Chinese script characters are employed.

The invention relates particularly to a word processing system for Chinese script characters wherein each character is selected from a large pool of characters according to predetermined rules which are natural to those familiar with the phonetic and graphical structure of Chinese. Moreover, the characters are stored in a manner adapted to economize substantially on computer memory.

There are several systems currently available for selecting Chinese script characters for input into a word processing system. In order to understand these methods, and more particularly their shortcomings, it is necessary to understand first the particular features of Chinese, as distinct from Western phonetic languages, which has tended to limit the accessibility of Chinese-speaking people to the use of typewriters, computers and word processing systems in general.

The conventional keyboard, with less than 100 keys, is designed for languages with phonetic scripts, such languages having a small set of graphic characters, i.e. letters. If such a keyboard were to be used in a corresponding manner for the direct input of Chinese script, it would require many thousands of keys since, unlike western phonetic languages, Chinese has many thousands of characters. Thus, the conventional keyboard is impractical for Chinese character input.

In order to understand the prior art methods for selecting Chinese script characters, the structure of the Chinese language must be understood. Chinese has a constrained phonetic structure. In spoken Chinese there are only 412 basic phonetic units, each having a monosyllabic sound. Four tonal patterns can potentially be applied to each phonetic unit, resulting in slightly more than one thousand distinct sounds. In comparison, phonetic languages, such as English, may have many thousands of distinct sounds.

Each distinct sound in spoken Chinese is a morphem, i.e. a semantically meaningful expression such as GO, SIT, MOON in English. In general, spoken Chinese does not have meaningless syllables, such as SEN, MIN, GA in English except for a handful of suffixes and affixes.

Whilst each distinct sound in Chinese is itself a meaningful semantic unit, in fact most phonetic units have several, sometimes even dozens of, different semantic meanings. The potential confusion in spoken Chinese, which could have resulted from the fact that nearly all such sounds each have many meanings, is solved in a unique way. The majority of Chinese words are expressed by a combination of two sounds, with each of the two sounds having its own meaning, and the double sound having a meaning which may be related or unrelated to that of the constituent parts. Although most Chinese morphems can have many different meanings, when two such morphems are combined, the resulting dimorphemic word is most often unambiguous.

The disyllabic structure of Chinese words has also influenced the structure of more complex expressions. Spoken and written Chinese has accumulated throughout its history a large number of phrases and idioms, which in many cases are vocalized by means of four distinct sounds and are written by means of four characters. In many cases these compound expressions are combinations of two disyllabic units, and often represent a complex semantic idea.

Whilst each phonetic unit and tone combination in Chinese can have typically many meanings, Chinese script characters have mostly a single or principal meaning. This is in marked contrast to Western, phonetic languages wherein ideas are usually communicated by means of a distinct vocal expression which is, in effect, character-encoded when those ideas are expressed in written form. In Chinese and associated languages, the idea is itself directly represented within the script and may therefore be interpreted regardless of the phonetic dialect of the reader.

Although most Chinese script is expressed vocally in a unique manner, several hundreds of the many thousands of Chinese script characters can be expressed vocally in more than one way. Additionally, some semantic units are sounded differently in colloquial speech than in literary expressions. Most such variations relate to the tonal pattern, although some relate to the phonetic unit itself.

Chinese script emerged from pictures depicting concrete objects. During the evolution of the Chinese script, new characters were formed by borrowing complete or partial images from existing characters, as well as by modifying the form of existing characters. Therefore, there are components and parts which appear in more than one character, although they do not always appear in identical form or location in each of the different characters. Moreover, the representation of characters in terms of their components does not follow systematic rules owing to the varied historical development of Chinese script.

Those components which appear in several characters are generally of two kinds:

(1) Phonetic indicators that were mostly borrowed from a formerly known character with a specific sound, and were used to express how the new character is sounded vocally, and (2) Semantic indicators, or radicals, that were mostly borrowed from a known character with a certain meaning, and were designed to express the ideological source of the new character.

However, the exact meaning of a character cannot always be derived from the radical, nor do the phonetic elements give a clear visual indication as to how the character is sounded. Each character must be separately learned and memorized as a whole unit, comprising a combined shape, sound and meaning.

It will be understood from the foregoing, that a Chinese word is read not as a combination of images, as in Western phonetic languages, but rather as a unique visual template, whose complete form indicates a specific meaning. Some templates might share graphic components with other templates, but the combination of such parts in no way resembles the process in which letters are combined so as to form words in a phonetic language. Also, whilst most templates share a phonetic association with other templates, each template is uniquely associated with a distinct meaning.

Conversely, when writing phonetic scripts, letters are combined into phonetic strings in order to produce words. Each word will usually have a unique sound. In Chinese, a word is expressed by means of a unique, complete picture which has an associated sound, even though this sound will be common to many other characters.

In most languages, Chinese included, the frequency of usage of different words is widely varied. Some words are used very frequently, whereas others are encountered only rarely. Typically, a rather limited set of less than one thousand words constitute nearly 90% of the word count in spoken and written vocabulary, with some words each accounting for as much as 5% of the total word usage. This is true in Chinese for both monomorphemic and dimorphemic words constituted, respectively, by one or two characters.

Since Chinese script characters are used directly to represent ideas, different groups of people will utilize different characters in rather the same way that they will employ different vocabularies in phonetic languages. Thus, since an engineer uses a different vocabulary to that of a lawyer or doctor, he will also be familiar with a different set of characters over and above the basic general set. This situation is not encountered in phonetic scripts, wherein all words share the same limited set of letters and, at least phonetically, any word can be read.

The various prior art methods for selecting Chinese script characters in word processing systems are based on one or more of the properties of the structure of written Chinese explained above. Thus, for example, in the recognition and matching method, a character is selected from a huge static display in which all characters are shown simultaneously. A character is selected directly in the same way that letters are selected directly in phonetic scripts. The drawback of such a method is that it is difficult to identify a required character from such a large character display; the device is physically large; and even for highly trained operators the method is tedious and relatively slow.

In an alternative system, each character is assigned a numeric or Latin alphabetic code which is typed on a conventional keyboard. The code is then translated so as to select the corresponding Chinese script character. This method demands that the code for each character be memorized, and its use is therefore limited to highly skilled personnel.

In the reconstruction method, characters are recombined from their component parts which, as was explained previously, may be common to more than one character as a result of the evolution and development of the Chinese script. The drawback with such a method is that a large number of components (214 radical elements and 858 phonetic elements) is required to generate all Chinese script characters. Moreover, the components vary in shape and location within different characters, even further increasing the total number of graphic elements requiring representation. In one practical embodiment of such a system, a keyboard is provided having several hundred keys corresponding to every possible component. A character is generated by typing several strokes in sequence.

An adaptation of this method is the Chan Jie method which is used in personal computers. In this method, several dozen key components are assigned to the keys of a standard computer keyboard. A character is selected by entering a corresponding combination and sequence of these components. This process demands considerable training, since each manufacturer utilizes a different strategy for correlating the components with the small number of keys available.

Another variation of this method, developed in Taiwan, is the three-corner method wherein the components are assigned numeric as opposed to alphabetic codes. Each character is expressed by means of three 2-digit codes.

Underlying the Chan-Jie, the three-corner and all other reconstruction methods, is an attempt to use standard alpha-numeric keyboards to construct a character as a series of predetermined components. This is analagous to the construction of words in a phonetic script wherein the components are constituted by the letters spelling the word. However, this method of construction is unsuitable for Chinese, whose character set contains hundreds of components, each character being constructed from a small number of these components but not in accordance with a defined set of rules. Therefore, it is virtually impossible to devise a logically consistent method, which is also easy to learn, for constructing Chinese characters from their components, and this drawback is reflected in all of the reconstruction methods.

An alternative method for generating Chinese characters is by specifying the strokes from which each character is built. There is a limited number of basic strokes, each character being composed from between 1 and 33 such strokes, according to strict rules regarding the order of stroke entry. Therefore, it is possible, by specifying a small number of basic strokes, to display a relatively small group of characters in which the same basic strokes appear in the specified order. The desired character is then selected from this display. In one practical application of this method, only the first and last strokes of the desired character are input, all characters sharing the same first-last stroke combination being displayed for final selection. It is both unnatural and demands concentration to select a character by specifying its first and last strokes, particularly for those characters having a larger than average number of strokes. Thus, although this method of character generation is attractive in theory, being based on well-defined rules, hitherto proposed systems based on this method have been unsatisfactory.

In another method for selecting Chinese characters, the 412 phonetic units of spoken Chinese are represented by phonetic symbols. The Pin-Yin system, commonly used in the People's Republic of China, utilizes Latin letters to express Chinese sounds. By entering the phonetic sound in Latin code, a series of characters sharing the same phonetic structure is presented for final selection. One drawback of this method is that translation of the Chinese character into secondary script is requited prior to the final selection, and therefore exact knowledge of the translation codes and procedures is mandatory. Since there are many dialectic and cultural variations in expressions, it is not always possible easily to find the proper sequence of phonetic symbols needed to express the Chinese characters correctly. This problem is particularly manifest for the many half sounds in spoken Chinese which are difficult to express unambiguously in Latin code.

The method of selecting a character by specifying its constituent phonetic unit is considered by many to be the most attractive selection method, although hitherto proposed systems have so far been unsatisfactory.

Hitherto proposed methods for selecting Chinese characters mostly require an indirect character representation in the form of numbers, components, strokes or phonetic codes which must themselves be specified rather than the character itself. This requires that the large number of indirect character representations must be memorized exactly and, moreover, practical implementations of these methods are inflexible owing to the strictly defined codes which are entered by means of a keyboard containing a fixed set of keys The keys are normally limited in number to that of the standard alpha-numeric (QWERTY) keyboard. In order to map this small set of keys onto the large number of Chinese script characters, several keys must be typed in order to generate the code corresponding to a single Chinese script character. For example, in the three-corner method, six numeric keys are used for each character, whilst in the Chan Jie and the Pin Yin methods, the number of key strokes per character is approximately four or five.

Furthermore, the same set of keys and codes are used both for very common characters, which are encountered frequently, and for those characters which are encountered very rarely. This results in an inefficient utilization of the keys, a problem which is exacerbated by the different character distributions of various professions and activities.

A major drawback associated with hitherto proposed Chinese word-processing systems relates not only to the method of character selection, but also to the method of character storage within the system itself. The nature of this problem will best be understood with reference to the standard method of storing conventional phonetic characters which, in the English language for example, are limited in number to 26 lower and upper case letters. As has already been explained, the number of Chinese script characters which must be stored in a usable word processing system, is of the order of several thousand, and this requires a memory several hundred times greater than that required to store conventional phonetic alphabets.

The requirement for a large memory is due not only to the very large number of Chinese script characters, but also to the display format of the characters themselves. Chinese script characters are detailed and complex and require larger display formats than alphabetic characters. Thus, whilst alphabetic characters can be displayed on grids of 5×7 or 5×10 pixels, Chinese script characters require a grid of at least 24×24 pixels to be clearly legible. High resolution display is achieved only on grids of 48×48 pixels. Conventional methods of character storage in computer memories utilize bit-maps wherein each pixel is represented by a bit. The number of bits required to store a Chinese script character in bit-map formation is thus approximately 16 times greater than the number of bits required to store an alphabetic character (i.e., 576 compared with 35). Conventionally, many computerized Chinese word processing devices contain over 10,000 characters in their memory. But even a storage of only 5,000 common Chinese script characters in 24×24 bit-map formation requires 2,880,000 bits of memory, whilst the full Latin alphabet can be stored in less than 1,000 bits. If the grid be increased to 48×48 in order to achieve high resolution, a total of 12 megabits (or nearly 1.5 MBytes) will be required.

The resolution with which Chinese script characters may be displayed affects not only the memory requirements but also effectively limits the number of characters which may be displayed simultaneously. This is an important consideration for those word processing systems which employ methods of character selection based on the visual display of a predetermined sub-set of characters in memory, such as in the recognition and matching method, and in those methods wherein characters are selected according to their strokes or components.

Thus, a method for storing Chinese script characters at high resolution in a relatively compact format is not merely advantageous in terms of memory requirements but, more importantly, directly affects the effectiveness of the selection method itself. Such effectiveness is also dependent upon the use of a high-resolution display monitor.

A further drawback associated with hitherto proposed Chinese word-processing systems relates to the ease of copy typing. In an ideal system, a copy typist concentrates on the document to be copied, only periodically scanning the input text. In prior art Chinese word-processing systems, this approach is feasible only for those systems which employ mechanical keyboards with a limited number of keys for selecting Chinese script characters by entering a sequence of codes. For those systems which present information on a computer display monitor for selection by the operator, it is impossible to concentrate both on the input document and the display monitor simultaneously.

SUMMARY OF THE INVENTION

It is an object of the invention to provide a method and apparatus for selecting, storing and displaying Chinese script characters which enables characters to be stored in a relatively compact format and overcomes many of the disadvantages associated with hitherto proposed selection methods and systems.

According to the present invention, there is provided in a computerized system containing a memory, a method for selecting and storing a specific Chinese script character comprising:

displaying a first array of characters corresponding to a representative selection of the phonetic units of spoken Chinese, selecting from said first array a representative character having the same sound as the specific character, identifying all characters having the same sound as said representative character, displaying a second array of said identified characters, selecting from said second array said specific character, and storing said specific character in said memory.

The first array of characters contains all those characters which have associated with them unambiguous phonetic sounds. This procedure is not alien to Chinese, since many dictionaries include representative characters in their Pin Yin tables.

The choice of frequently used characters as representative characters on the display will facilitate the selection process. In a preferred embodiment, the first array includes 412 characters, and since the 400 most common characters represent a usage of over 70%, it would be preferable to display only these very common characters in the first array. However, this is not entirely feasible since some sounds are quite rarely used, and some very common characters cannot be used to represent a specific sound unambiguously. Including representative characters for these rare sounds, and eliminating the "ambiguous" common characters from the first array still provides a usage factor of over 50%.

In a typical dictionary containing over 7,000 characters, the maximum number of characters having the same sound is of the order of 140. However, the median number of characters per phonetic group is approximately 20. Thus, in most instances, the number of characters in the second array, having the same sound as a representative character in the first array, is sufficiently small to enable efficient selection of the desired character.

A further embodiment of the invention takes into account the frequency of character usage in those cases where there is a large number of characters in the second array. In this case, only the common characters in the second array are initially displayed, the remaining characters being displayed only when the desired character is not found among these common characters. Although for uncommon characters this involves an additional display and selection stage, this apparent disadvantage is more than offset by the increased display and selection speed in the majority of instances when the desired character is common.

By displaying characters according to their frequency distribution, very fast selection may be achieved for the most common characters since these will generally be displayed immediately on account of the skew frequency distribution of Chinese script characters. The usefulness of this embodiment is improved by means of a software facility which accumulates frequency data as the system is used, and adjusts the stored frequency distribution supplied with the system, so as to correlate with non-standard vocabularies of particular users.

In further embodiments of the method, characters may be selected by entering component strokes in their correct sequence and an iterative procedure is provided which displays a small number of the most frequently used characters and graphic elements (which can be either a phonetic element or a radical) containing the specified stroke sequence. If the desired character is not displayed but its first graphic element appears on the screen, the graphic element may be selected and a small number of the most common characters containing this graphic element will be displayed. Alternatively, further strokes are entered. When the desired character appears on the screen, it is selected, the iterative procedure providing faster selection.

Strokes may be entered into the system in two ways. A table of basic strokes is constantly displayed, from which a desired stroke may be selected. Alternatively, the facility is provided actually to draw strokes on the screen of a display monitor associated with the system, since it is often more convenient to draw the strokes in preference to selecting them iteratively using the above method.

In order to display the various arrays in a legible manner, a high resolution screen must be used and characters must be stored at high resolution. A preferred method for storing the characters is to store a representative set of strokes from which all characters in the system may be constructed. This requires storage of only a small number of strokes which can therefore be stored at high resolution without using excessive memory. The characters themselves are then encoded in a compact form which identifies all the constituent strokes and their locations within the character.

A preferred apparatus for carrying out any of the methods of the invention includes a computer coupled to a very high resolution display monitor via a high speed graphics processor. Specific information displayed on the monitor may be identified by means of a light pen provided with two microswitches, whereby an identified character may be stored directly by closing one of the microswitches, whilst related characters may be displayed by closing the other microswitch.

BRIEF DESCRIPTION OF THE DRAWINGS

The invention will now be described with regard to a method and apparatus for selecting and storing a Chinese script character in a word-processing system, with reference to the accompanying drawings in which:

FIG. 2 shows the phonetic table referred to in FIG. 1;

FIG. 3 shows details associated with the phonetic table shown in FIG. 2;

FIG. 4 shows details relating to the selection of Chinese script characters by their graphic attributes;

DETAILED DESCRIPTION OF PREFERRED EMBODIMENTS

Figure 1:
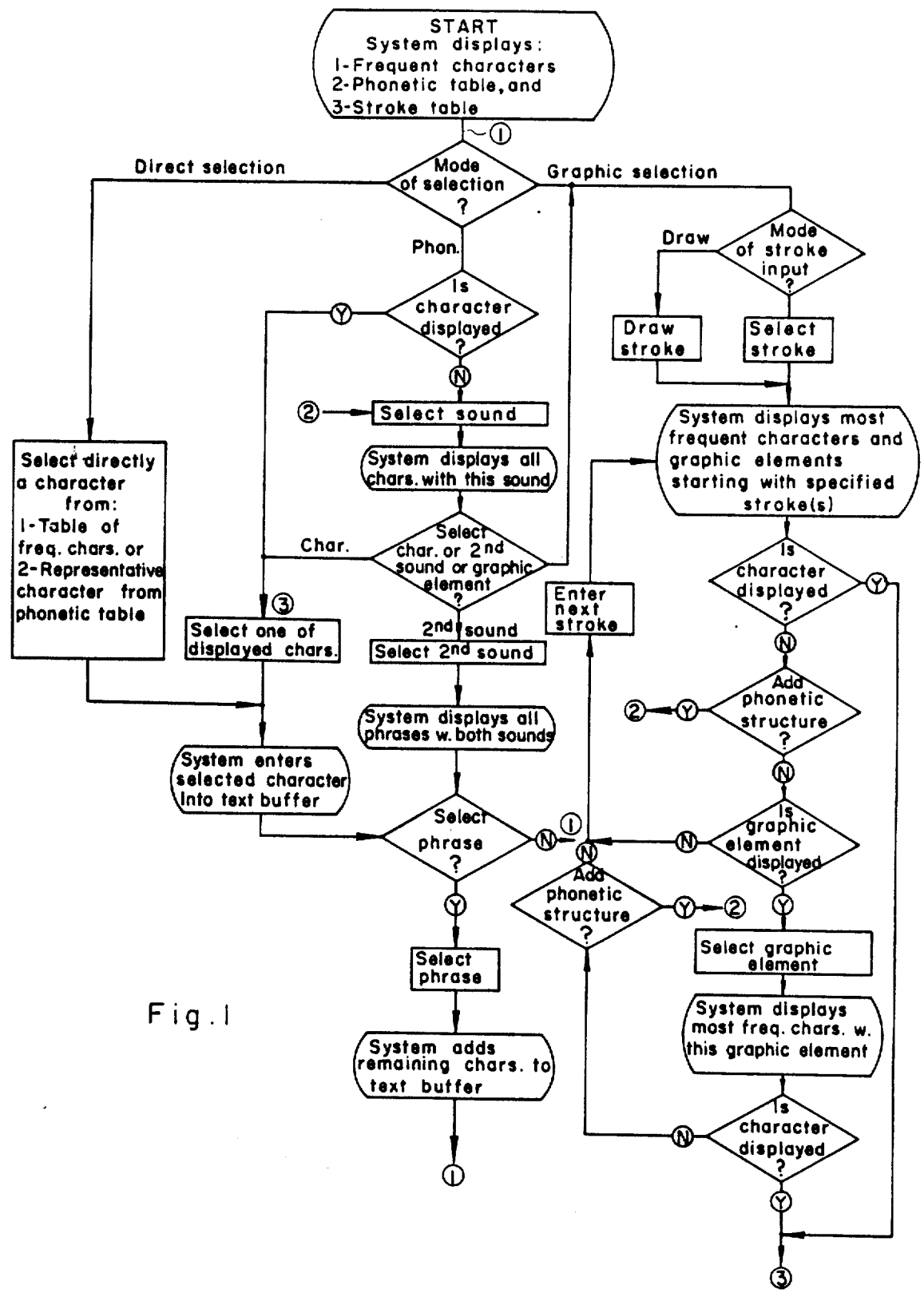
FIG. 1 is a flow diagram showing several methods for selecting Chinese script characters according to the invention.

FIG. 1 shows various methods of selecting Chinese script characters according to the invention. It will be seen that there are basically three different modes of character selection, shown as "direct" selection, "phonetic" selection and "graphic" selection. In the direct selection mode, there is displayed within a first area 1 (FIGS. 3 and 4) of a display monitor 2 a selection of some of the most commonly used characters (including numbers and punctuation) and phrases. One of these characters or phrases may be identified with a light pen (to be described in detail below) and selected directly by closing a first microswitch associated with the light pen. The selected character or phrase is then displayed within a second area 3 (FIGS. 3 and 4) of the display monitor 2 and is stored within a text buffer associated with a random access memory, to be described in greater detail below. At the top of the second area 3 is shown a document window 4 within which a document may be displayed one line at a time, after first being scanned with a handheld scanning device as explained in greater detail below with reference to FIG. 5.

Figure 2:
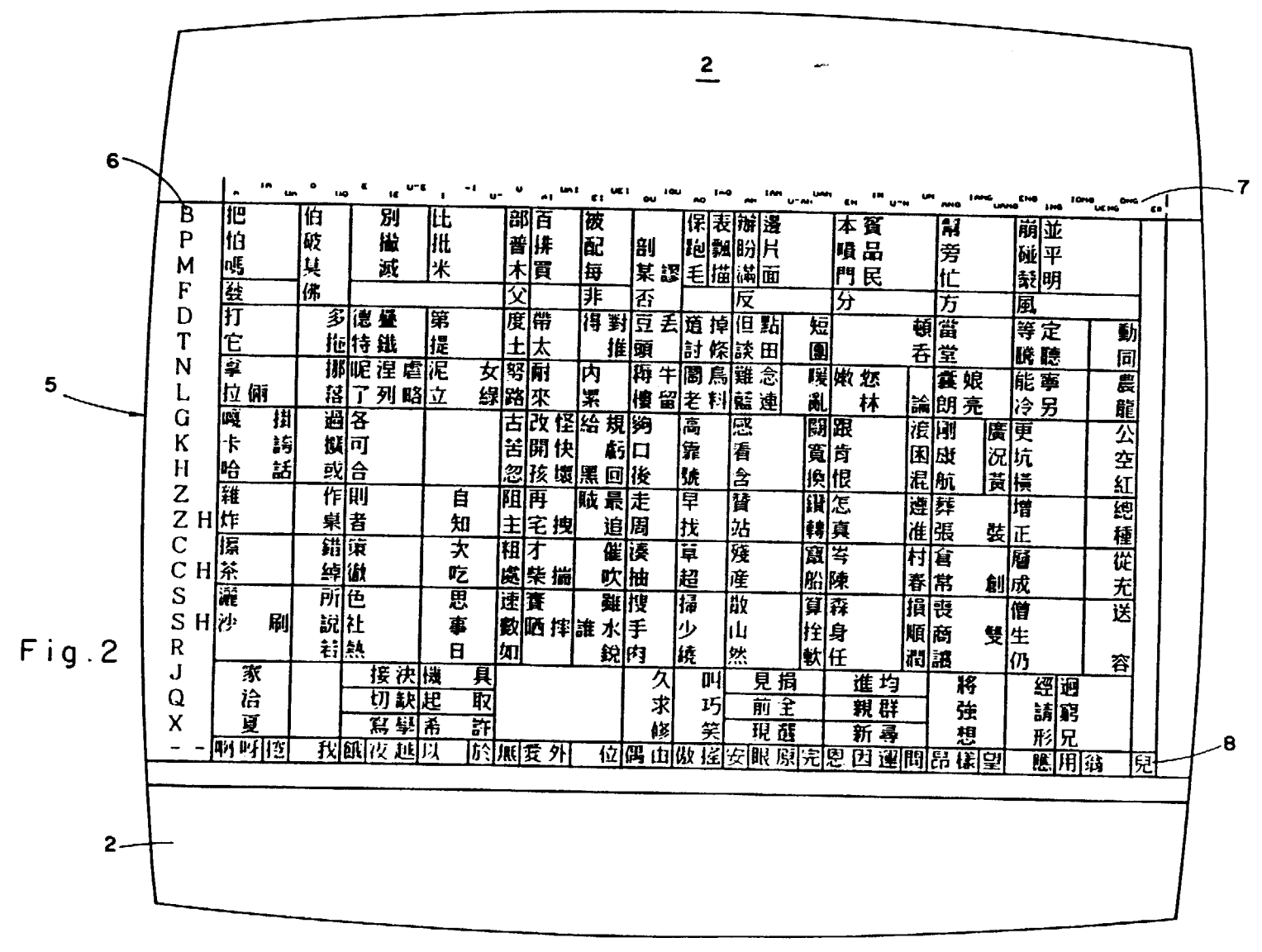

In the case of phonetic or graphic selection, each character is found and displayed through one of its basic attributes: its specific sound, its major graphic components or its strokes arrangement. FIG. 2 shows a phonetic table 5 (constituting a first array of characters), corresponding to a representative selection of the phonetic units of spoken Chinese, which is displayed on the display monitor 2 in a first stage of the phonetic selection mode. By placing the light pen over a representative character having the same sound as the specific character to be entered, and by pressing a second microswitch associated with the light pen, a second array of characters having the same sound as the representative character will be displayed on the display monitor 2. The specific character to be entered may then be selected from the second array by placing the light pen over the specific character and pressing the first microswitch. The representative character may itself be selected directly from the phonetic table 5 after identifying it with the light pen, by pressing the first microswitch. In this case, selection is more rapid since display of the second array is eliminated.

The phonetic table 5 is organized as a 2-dimensional matrix according to the phonetic rules of Chinese. Chinese script characters are generally vocalized in a consonant-vowel (CV) or consonant-vowel-consonant (CVC) or consonant-vowel-vowel (CVV) form, such that most phonetic expressions start with consonants. There are 21 consonants in Chinese phonetic tables and dictionaries, and these are tabulated along one column 6 of the matrix. Along a row 7 of the matrix are tabulated the 37 vowels (V), vowel-consonants (VC) and vowel-vowel (VV) elements.

This arrangement does not represent a complete set of sounds, since there are a minority of characters which do not start with a consonant, but are drawn from the above-listed family of 37 V, VC or VV. Thus, it is necessary to add another row 8 to the matrix, corresponding to the "zero consonants".

The arrangement of the first array shown in FIG. 2 facilitates selection, since a user has only to check on the intersection of the appropriate row vector and column vector in order to obtain the desired phonetic unit. Since each row vector is associated with a known consonant and each column vector is associated with a known vowel, vowel-consonant or vowel-vowel element, an experienced user with sufficient knowledge of phonetic Chinese tables will know in which parts of the first array to search for the representative sound he is trying to select.

Figure 3:
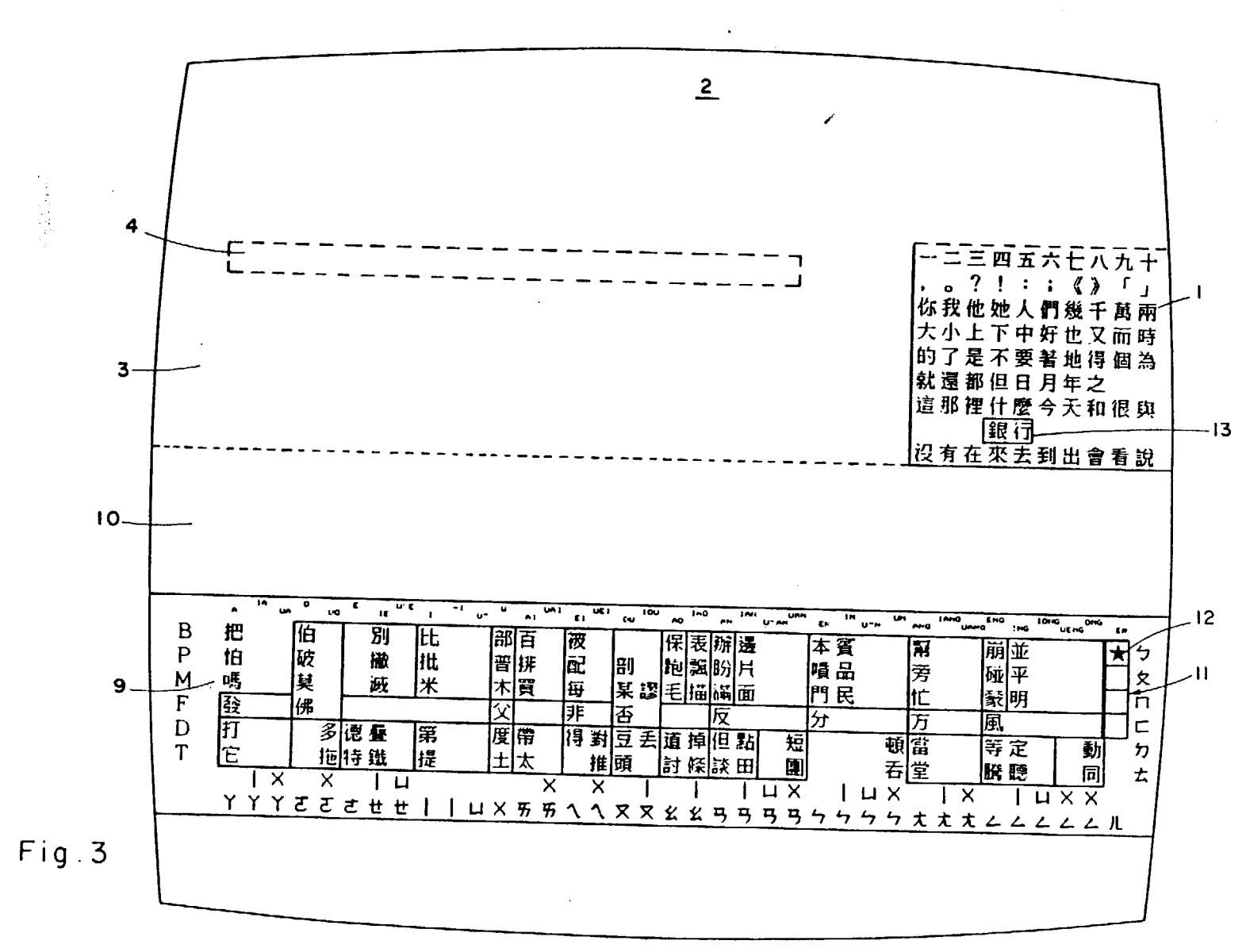

FIG. 3 shows a quadrant 9 extracted from the phonetic table 5 shown in FIG. 2. By displaying only one quadrant at a time, space 10 is left not only for the display of characters and phrases having the same sound as a selected representative character, but also ample space 3 is available for text. The quadrant 9 displayed on the display monitor 2 includes a geometrical key 11 comprising a column of four squares, each one corresponding to a respective horizontal quadrant of the phonetic table 5. The selected quadrant is identified by means of a cursor 12 in the form of an asterisk within the appropriate square of the geometrical key 11. Any quadrant of the phonetic table 5 may be selected for display, by identifying the corresponding square within the geometrical key 11 with the light pen and pressing the first microswitch.

Figure 4:
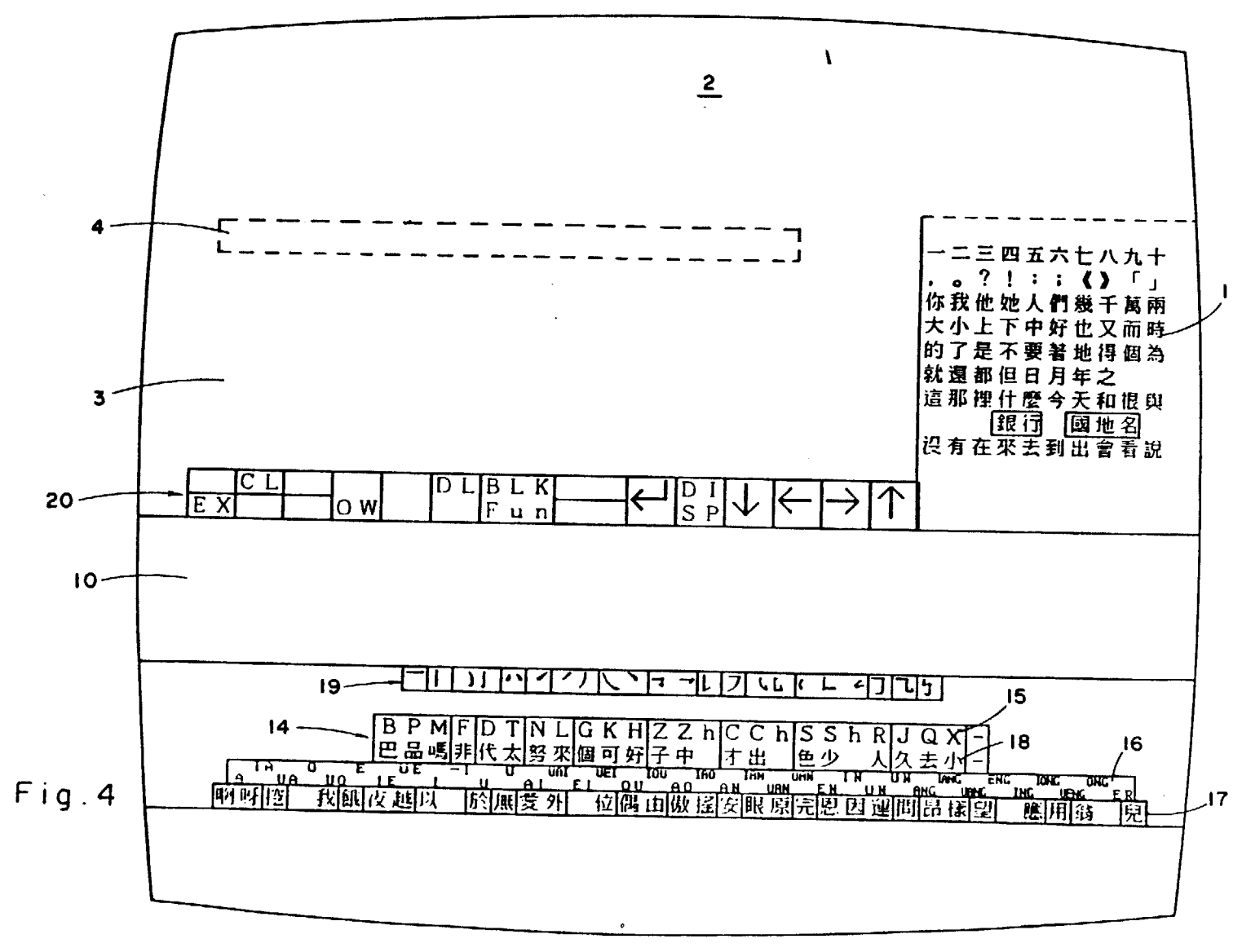

The provision of mode keys displayed on the screen of the display monitor 2 has already been described. In a preferred embodiment, different professions are identified by corresponding mode keys. For example, a mode key 13 is shown in FIG. 3 relating to the banking profession, which may be selected with the light pen by pressing the second microswitch. This causes all terms and phrases stored within the database and corresponding to banking, to be displayed, enabling a desired term to be selected directly by means of the light pen and its associated first microswitch FIG. 4 shows a method for reducing even further the display size of the first array. A short-hand phonetic table 14 is displayed which comprises three rows 15, 16 and 17 corresponding, respectively, to the 21 consonants, the 37 vowel consonant combinations and the "zero consonants" associated with Chinese script characters. To select a representative character from the short-hand phonetic table 14, either a "zero consonant" character is selected directly from row 17 or, alternatively, an appropriate consonant and vowel-consonant combination are selected from rows 15 and 16, respectively.

Owing to regional and dialectical differences in the way Chinese script characters are pronounced, it may sometimes happen that a representative character identified from the first array (FIG. 2) or a section thereof (FIGS. 3, 4) will not display the desired set of characters in the second array. This will happen where several representative characters have similar sounds which are confused in different dialects of spoken Chinese. To compensate for this, representative characters within the first array may be grouped such that identification of a representative character within a group will cause all characters associated with all the representative characters in the group to be displayed in the second array.

FIGS. 2 and 3 show how the representative characters in the first array may be grouped, the boxes enclosing the characters indicating the extent of each group. This may also be seen in FIG. 4 wherein there is shown a fourth row 18 containing representative characters having sounds corresponding to the 21 consonants in the first array. Selection of any representative character from the fourth row 18 causes all characters to be displayed having sound similar to each of the characters within a selected group. However, the arrangement of groups shown in FIGS. 2, 3 and 4 is only representative, since a user may easily define different groups under software control, in accordance with regional, lingual, dialectical and individual needs.

Referring again to FIG. 1, it will be seen that the phonetic table 5 is useful not only for selecting individual characters but, moreover, may also be used to select polysyllabic words and phrases represented by more than two characters. This facility is provided in one of two ways.

It has already been explained that the vast majority of Chinese words consist of two Chinese morphems and are written by two characters. When a dimorphemic word is to be selected, first and second representative characters are selected from the first array having the same sounds respectively as the two morphems of the dimorphemic word to be selected. In this case, both selections are made from the first array and result in a third array being displayed of representative dimorphemic words having a phonetic structure corresponding to the selected first and second representative characters. The number of words displayed in the third array will be very small, since dimorphemic phonetically identical homonyms are quite rare.

Similarly, polysyllabic words and phrases represented by more than two characters may be selected from the first array in an identical manner to the selection of dimorphemic words. Since the number of polysyllabic words and phrases corresponding to selected sounds is typically very small, they can be displayed within the third array together with the dimorphemic words.

An alternative method of selecting polysyllabic words and phrases may be employed when a single character is selected according to its phonetic structure, as described above, or according to its graphic structure as is described below with reference to FIG. 1. If a character is selected with either method using the second microswitch instead of the first microswitch, then the identified character is entered into the text buffer, and a fourth array of representative polysyllabic words and phrases starting with the selected character, is displayed. A desired polysyllabic word or phrase may then be selected directly by means of the light pen and pressing the first microswitch. In this case, all characters subsequent to the first character are added to the text buffer.

FIG. 1 also shows an alternative mode of selecting a desired character according to the graphic attributes of Chinese script characters. It is seen that a first stroke may be entered into the system according to the sequence in which strokes are drawn in the desired character. This causes the ten most frequent characters and graphic elements, starting with the specified stroke, to be displayed. If the desired character appears amongst this display, it may be selected directly by means of the light pen and the first microswitch. If the desired character is not displayed, but a component graphic element of the desired character is displayed, then the component graphic element may be selected with the light pen by pressing the second microswitch. This substitutes a new set of ten characters which contain the identified graphic element.

If the desired character is now displayed, it may immediately be selected with the light pen by pressing the first microswitch. In the event that neither the desired character nor a component graphic element appears on the screen, additional strokes may be entered, the whole procedure being repeated in an iterative manner until the desired character is displayed for selection. By displaying those characters and graphic elements which occur most frequently, it will generally be found that the desired character is displayed within a very small number of iterations.

FIG. 4 shows one system for entering the strokes according to the above method. Displayed on the display monitor 2 is a stroke table 19 showing fifteen basic strokes from which all Chinese script characters may be constructed. One of these strokes may be selected in the normal manner with the light pen by pressing the first microswitch. The stroke table 19 remains displayed so that further strokes may be entered as required.

An alternative system for entering the strokes is manually to draw them on the screen of the display monitor 2 using the light pen. This method for entering strokes is often preferred, since writing Chinese script characters is an automatic process, based on a memorized motor program, making it more convenient actually to write the script character rather than construct it iteratively from its individual strokes.

In order to draw a stroke on the screen of the display monitor 2, an area of the display monitor 2 is raster scanned so that it appears to the user to be uniformly bright. The light pen is then moved across this area of the screen and every time its position on the screen coincides with an illuminated pixel, a signal is generated by a photodiode within the light pen. Thus, the movement of the light pen across the screen effectively generates a series of coordinates permitting the input stroke to be interpreted in bit-map format, under software control, by analyzing the stroke map stored within the database.

The resolution of a stroke input in this manner depends on the relative speed at which the light pen is moved across the screen as compared with the refresh rate of the screen itself. Fine resolution of the input strokes is not possible when the display monitor 2 is scanned using a 60 Hz refresh cycle, since the same pixel on the screen will be illuminated for a few nanoseconds every 16 milliseconds. During each 16 millisecond interval, the movement of the light pen over the screen of the display monitor 2 bypasses too many pixels to permit its detection with a satisfactory spatial resolution. It is therefore necessary to scan the screen faster and to increase the refresh rate several-fold. In a preferred embodiment, the frequency of the refresh cycle is increased to 180 Hz and a correspondingly smaller area of the screen (containing one-third of the number of scan lines) is scanned.

FIG. 4 also shows a set of keys 20 which permit standard word-processing functions to be performed under software control.

It will be seen from FIG. 1 that the methods of selecting Chinese script characters in terms of their phonetic and graphic structure are interrelated. Thus, it is possible to select a desired character by specifying its phonetic structure and further restricting the number of identified characters by then specifying its first stroke or graphic element. Alternatively, the first stroke or graphic element of a character may be specified, the number of identified characters being further restricted by specifying as well its phonetic structure. This interaction between the two major methods of selecting Chinese script characters results in a highly flexible system which may, in effect, be tailored by the operator in order to permit virtually instantaneous selection of common Chinese script characters, whilst permitting relatively less common Chinese script characters to be selected within a very small number of iterations.

All the methods according to the invention utilize the fact that the database is so structured that all characters and phrases can be identified in terms of their component sounds and graphic elements. It is therefore a simple matter to extract from the database all characters and phrases which match any element that constitutes an index of the database. For example, if radicals themselves are indexed, then selection of a specific radical will point to all characters and phrases containing this radical. Polysyllabic phrases may optionally be selected by selecting two radicals associated respectively with the first two characters of the phrase. Similarly, selecting the strokes corresponding respectively to the first strokes of the first two characters will identify all words and phrases matching the specified stroke combination. Selecting a sound of a first character and a graphic element of a second character, will likewise point to a limited set of words and phrases, and so on.

Figure 5:
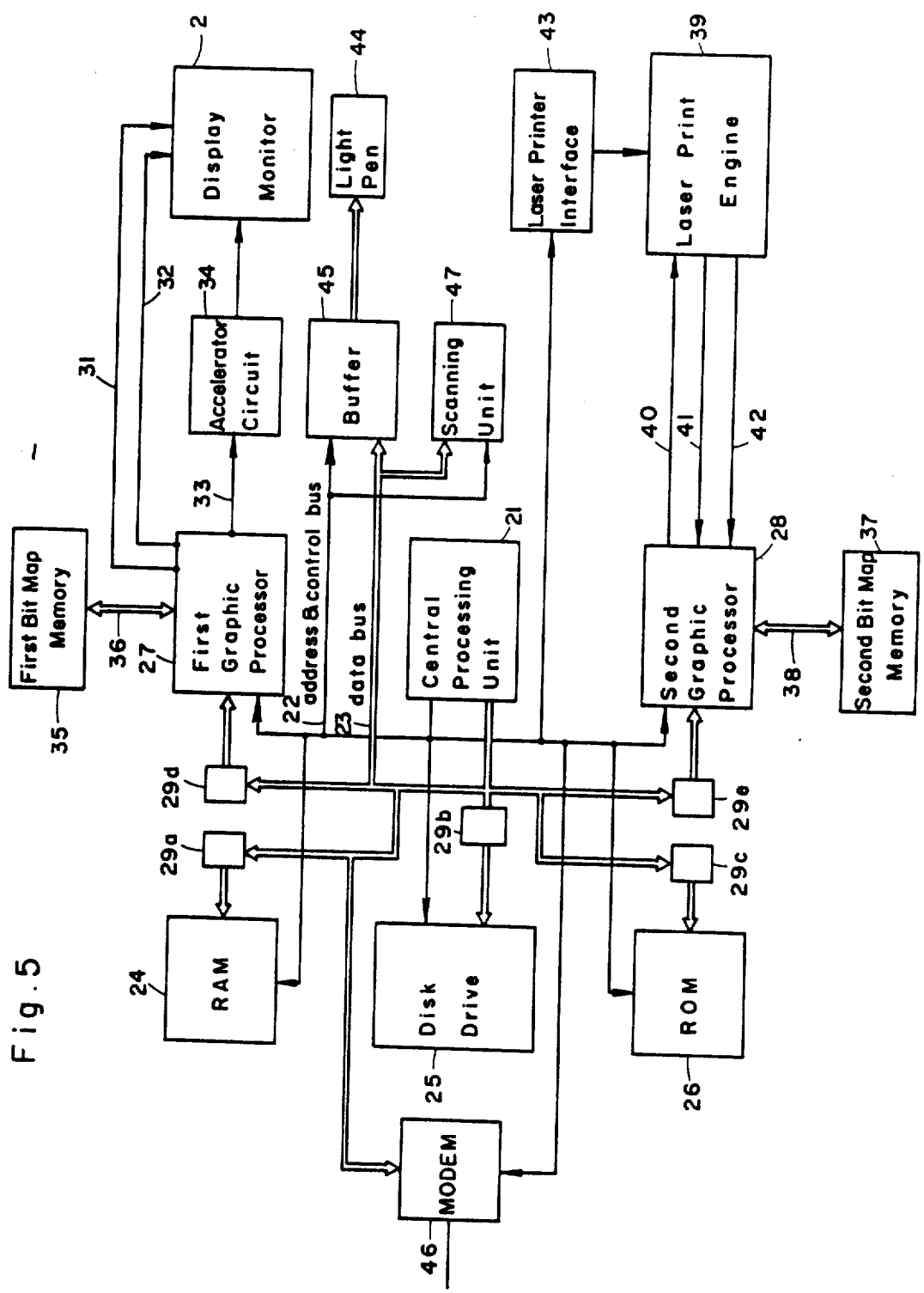
FIG. 5 is a block diagram showing functionally an apparatus according to the invention.

Referring to FIG. 5, there is shown a central processing unit 21 associated with which is an address and control bus 22 and a data bus 23. The data bus 23 is connected to corresponding inputs in a random access memory (RAM) 24, a mass storage device 25, a read only memory (ROM) 26 and first and second graphics processors 27 and 28 (such as, for example, manufactured and sold under the trade designation INTEL 82786), respectively. Each of these devices is controlled by the central processing unit 21 via the address and control bus 22 which is connected to the three memories 24, 25 and 26 and the two graphic processors 27 and 28 by means of bi-directional buffers 29a, 29b, 29c, 29d and 29e; respectively.

The central processing unit 21 is controlled by means of an instruction set stored within the ROM 26 and the mass storage device 25 is preferably a disk drive. Timing signals for the central processing unit 21 are derived by means of a clock (not shown) which runs at a first clock frequency of 25 MHz.

The first graphic processor 27 is coupled to a raster scan display monitor 2 via first horizontal and vertical synchronization lines 31 and 32, respectively. Video data is transmitted along a first video data line 33 by means of which the display monitor 2 is coupled to the first graphic processor 27 via an accelerator circuit 34. The first graphic processor 27 is connected to a first bit-map memory 35 by means of which graphical data is transmitted to and from the first graphic processor 27 along a data bus 36.

In a similar manner, the second graphic processor 28 manipulates data stored in the second bit-map memory 37 which is coupled to the second graphic processor via a data bus 38. The second graphic processor 28 is coupled to a laser print engine 39 via second horizontal and vertical synchronization lines 40 and 41, respectively and a second video data line 42. The laser print engine 39 is controlled by a laser printer interface 43 and provides the preferred means for printing Chinese text selected and stored according to the invention.

Data displayed on the display monitor 2 may be identified by means of a light pen 44 which transmits data to the data bus 23 via a buffer circuit 45 coupled to the central processing unit 21 by means of the address and control bus 22 and the data bus 23. These two buses may also be connected to a modem 46 by means of which remote communication with other systems is possible.

In a preferred embodiment of the invention, provision is made for connecting a hand-held scanning device 47, such as are manufactured by both the Canon and Epson Companies of Japan, to the central processing unit 21 via the address and control bus 22 and the data bus 23. The scanning device 47 is adapted to scan a document and to digitize the text thereon into bit-map format. The bit-map is then stored in a section of the first bit map memory 35 and is processed by the first graphic processor 27 so as to display one line of text within the document window 4 (FIGS. 3 & 4) at the top of the display monitor 2. By identifying the document window with the light pen 44 and pressing either the first microswitch 77 or the second microswitch 78, the document can be scrolled down or up, respectively, within the document window.

Figure 6:
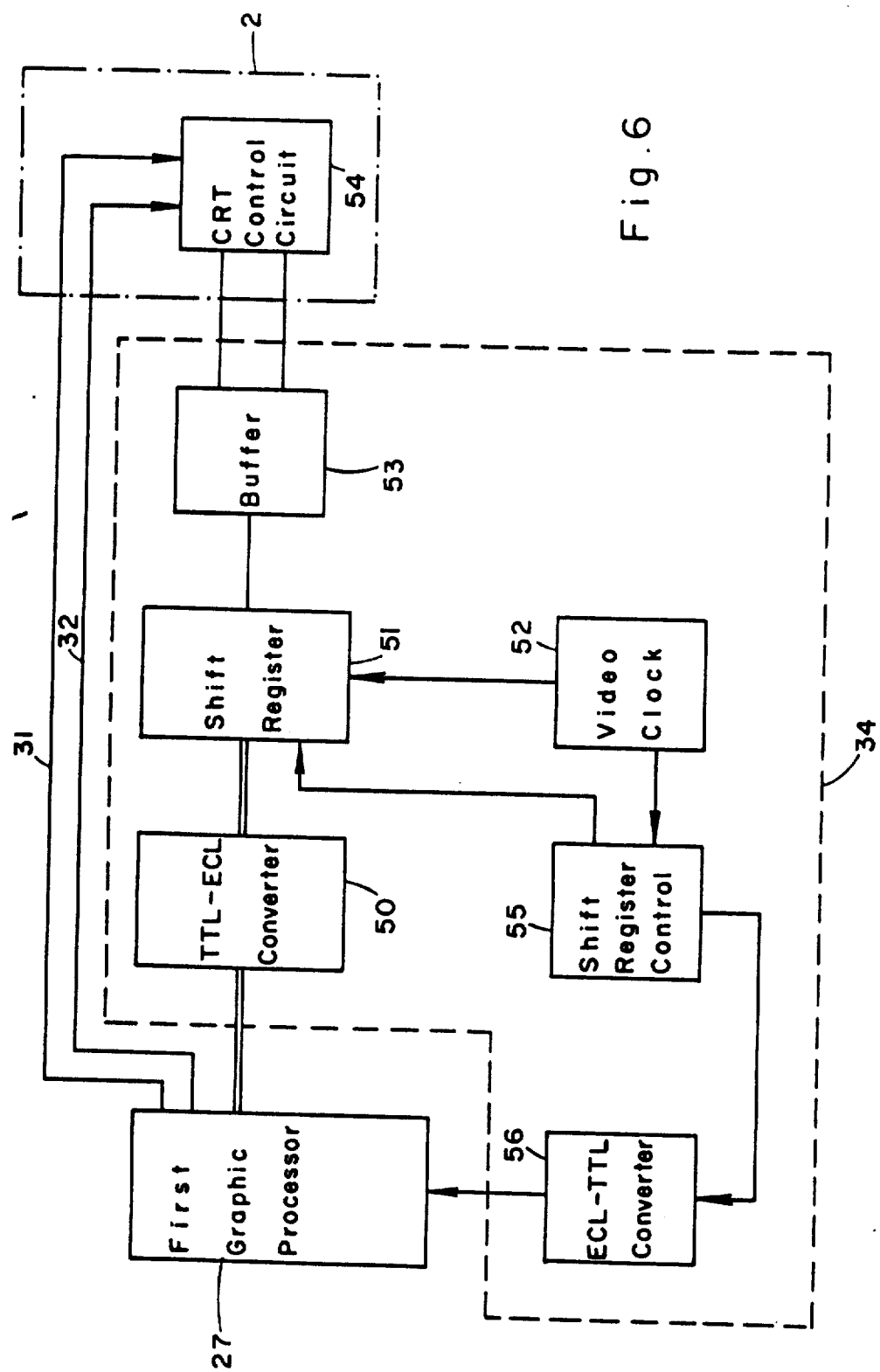
FIG. 6 is a block diagram showing in greater detail a part of the apparatus shown in FIG. 5.

FIG. 6 shows in greater detail the accelerator circuit 34 shown in FIG. 5. The video data appearing on the first video data line 33 is stored in the first bit-map memory 35 in the form of TTL logic signals which are too slow for the high data rate required. Therefore, the video data produced by the first graphic processor 27 is fed to the TTL-to-ECL convertor 50 whose output is fed, 8 bits at a time, to a shift register 51. The shift register 51 is controlled by a video clock 52 which provides a second clock frequency of 200 MHz, i.e. eight times as fast as the clock frequency of the central processing unit 21.

The shift register 51 converts the video data from parallel to serial format and feeds the resulting serial data via a buffer 53 to a CRT control circuit 54 which controls the display monitor 2. Also fed to the CRT control circuit 54 are the first horizontal and vertical synchronization lines 31 and 32, respectively.

A shift register control circuit 55 controlled by the video clock 52 is coupled to the shift register 51 and is used in order to control the serial and parallel operation of the shift register 51. ECL logic clock data derived from the shift register control circuit 55 is converted to TTL logic by means of an ECL-to-TTL converter 56 and fed back to the first graphic processor 27, which is thereby able to synchronize the parallel input to the shift register 51 with its serial output.

Figure 7:
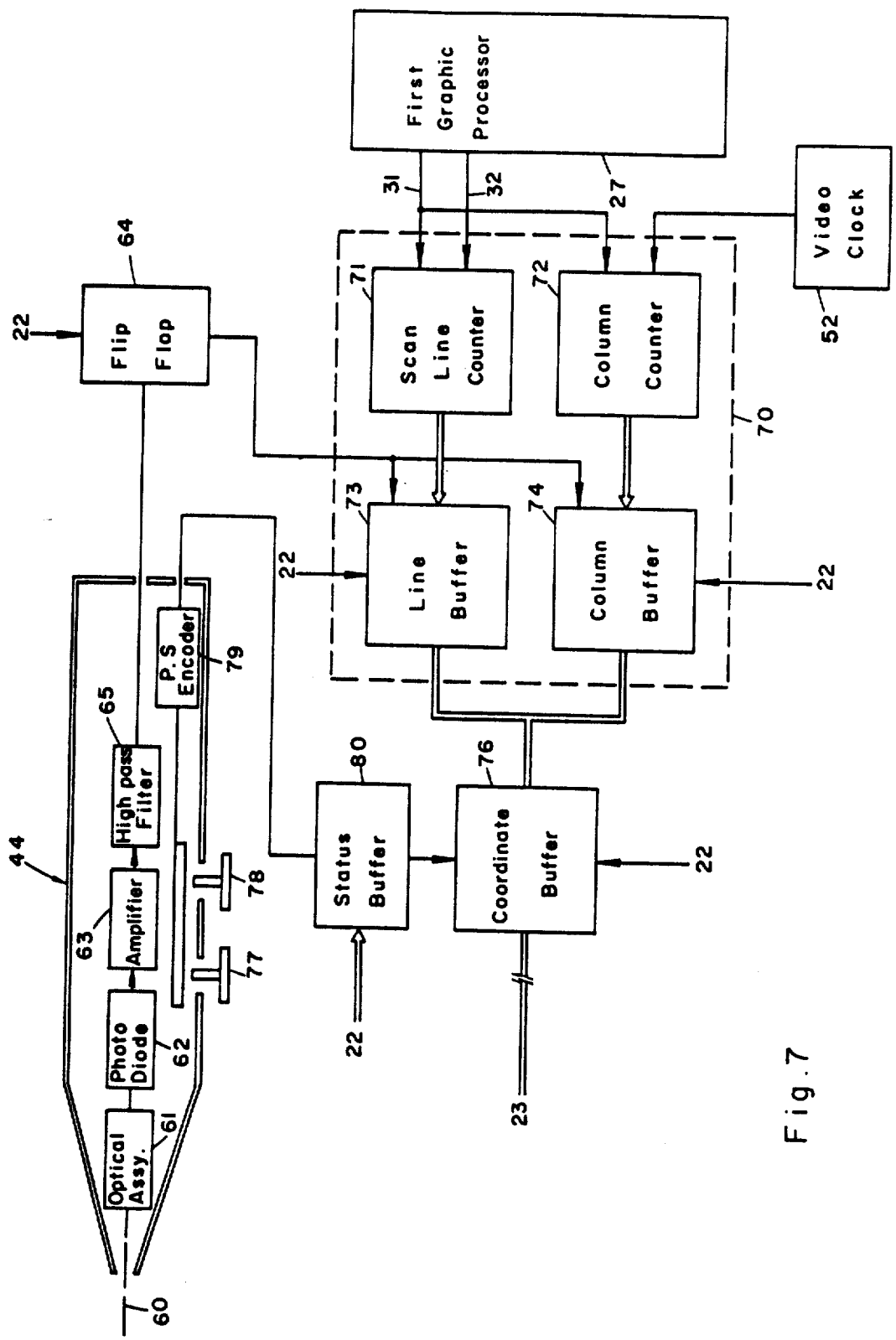
FIG. 7 is a block diagram showing in greater detail a part of the apparatus shown in FIG. 5.

Referring to FIG. 7, the circuitry associated with the light pen 44 is shown in greater detail. The light pen 44 is adapted to detect light 60 emitted by a pixel in the display monitor 2, which light is amplified by an optical assembly 61. The amplified light output is detected by a photodiode 62 whose output is amplified by an amplifier 63 and coupled to a flip-flop 64 by means of a high-pass filter 65.

The output from the flip-flop 64 is fed to a position detection circuit 70 which identifies the position of the pixel on the display monitor 2 identified by the light pen 44. The position detection circuit 70 comprises a scan line counter 71 which is coupled to the first graphic processor 27 via the first horizontal and vertical synchronization lines 31 and 32, respectively. The scan line counter 71 is thus synchronized to the scan line of the display monitor 34 and is therefore able to determine which scan line contains the pixel illuminating the light pen 44 at any instant of time. A column counter 72 receives signals from the first horizontal synchronization line 31 and from the video clock 52 and is therefore able to detect the position of the cathode ray within the identified scan line so as to define exactly the location on the display monitor 2 of the identified pixel. The line and column data is fed to line and column buffers 73 and 74, respectively, whose output is fed to the data bus 23 via a coordinate buffer 76 controlled by the address and control bus 22.

The light pen 44 is provided with first and second microswitches 77 and 78, respectively, whose status (i.e. open or closed) is encoded by parallel-to-serial encoder 79. When either of the two microswitches is closed, a signal is generated by the encoder 79 and fed to a status buffer 80 controlled by the address and control bus 22. The output from the status buffer 80 is fed to the coordinate buffer 76 from which it may be read by the central processing unit 21 via the data bus 23.

The operation of the system is as follows. The ROM 26 stores all the character data which is required for the operation of the word-processing system. Some of this character data is organized into a database containing all the possible Chinese script characters available for use, whilst a section of the RAM 24 is organized as a text buffer for storing textual data prepared with the word-processing system. The Chinese language data base stored within the RAM 26 is dynamic and may easily be augmented by the user who is able to construct new characters for adding to the database.

Data is displayed on the screen of the display monitor 2 and is identified by the light pen 44. The area of the display monitor 2 thus identified is highlighted by means of a cursor which is displayed under control of the first graphic processor 27, thereby providing the user with a visual feedback of the location of the light pen 44. An illuminated pixel on the screen of the display monitor 2 causes the photodiode 62 within the light pen 44 to generate a signal which is amplified by the amplifier 63 and causes the flip-flop 64 to change state, thereby acknowledging receipt of the light pen signal. It will be understood that although many pixels on the display monitor 2 appear to be illuminated simultaneously, in reality only one pixel is illuminated at a time. The position detection circuit 70 in effect determines from the horizontal and vertical scanning synchronization signals which pixel is illuminated when the light pen 44 is activated by closing either the first microswitch 77 or the second microswitch 78.

The first graphic processor 27 is a high speed circuit for writing the contents of the first bit-map memory 35 onto the screen of the display monitor 2. The first bit-map memory 35 is organized in such a way that it has one bit of memory corresponding to each pixel of the display monitor 2. The first bit-map memory 35 is continuously scanned in accordance with timing signals generated by the video clock 52. Thus, to change the display pattern on the screen of the display monitor 2, it is only necessary to change the contents of the first bit-map memory 35.

It is arranged that the first bit-map memory 35 is updated by the first graphic processor 27 in less than one scan cycle so that the resulting change in the information displayed on the display monitor 2 appears to be instantaneous. The first graphic processor 27 is capable of writing 200 MBits/second, or over 3 MBits per 60 Hz scan cycle. This is well over the total number of bits required for display even on a very high resolution display with over one million pixels, such as is needed in the present invention in order to display all the required information simultaneously.

The accelerator circuit 34 enables the vast number of pixels in such high resolution display monitors to be written at the very high speeds required. For example, a video frequency of approximately 90 MHz is required in order to write one million pixels at a 60 Hz refresh rate in a non-interlaced system.

The shift register 51 in the accelerator circuit 34 reads data from the first bit-map memory 35 eight bits at a time in parallel format, and outputs this data in serial format to the display monitor 2. In order to ensure that the serial output of the shift register 51 remains in synchronism with the parallel input data, it is necessary that the clock frequency to the shift register 51 be eight times as fast as that of the first graphic processor 27. The first graphic processor 27 derives its timing signals from the central processing unit 21 whose clock frequency is 25 MHz and, therefore, the video clock 52 driving the shift register 51 runs at a frequency of 200 MHz.

The organization of data within the first bit-map memory 35 is controlled by the central processing unit 21 from data loaded either from the disk drive 25 or from the ROM 26 into the RAM 24. Data which must be accessed rapidly by the first graphic processor 27 is held resident in the RAM 24, whilst other data is transferred to RAM 24 under program control when required. Data is organized in the RAM 24 in the form of a comprehensive database arranged in four sections:

(1) a library of basic strokes and their variants, (2) a character stroke map wherein are stored for each character a reference within the stroke library to each of its constituent strokes and its location within the character display grid, (3) a character attribute table wherein are stored for each character its sound, tone, stroke sequence table, radical and phonetic element types, and (4) a dictionary of polysyllabic words and phrases.

The database is organized in such a way that selection of a specific stroke or radical permits identification of all characters in the database including the selected stroke or radical. Similarly, selection of a specific phonetic unit permits identification of all characters within the database sharing this phonetic unit. Additionally, selection of a specific character permits identification of all polysyllabic words and phrases sharing the selected character. In all cases, the identification is achieved by reference to the attribute table within the database.

Since characters are stored in the database only by reference to a relatively small stroke library, only the contents of the stroke library need be stored, thereby permitting relatively compact storage of the characters and words themselves. The characters are reconstructed for displaying and printing by reference to the stroke map within the database. The saving in computer memory achieved by storing and reconstructing characters in this manner, permits several stroke libraries to be stored for only a modest increase in memory. Each stroke library may store the strokes at different magnifications corresponding, for example, to bit-map resolutions of 24×24 or 48×48 and so on. When it is required to display or print characters in an enlarged format, the bit-map data is read from the corresponding stroke library. This technique permits characters to be displayed and printed at high magnifications with very much improved resolution over conventional bit-map character storage, wherein imperfections in character definition are magnified together with the characters themselves.

Whenever a character is required to be displayed on the display monitor 2, the first graphic processor 27 operates under control of the central processing unit 21 to construct the character from the database stored in the RAM 24, a process which appears instantaneous to the user on account of the high speed of the first graphic processor 27.

Preferably, data in the RAM 24 is printed on a laser printer, in which case it is formatted by the second graphic processor 28 which acts in conjunction with the second bit-map memory 37. The second graphic processor 28 generates horizontal and vertical synchronization signals appearing on lines 40 and 41, respectively, for controlling the scanning of the laser print engine 39 in a manner analogous to the scanning system of the display monitor 2.

The data which is displayed on the display monitor 2 includes not only character information derived from the database in the RAM 24, but also a series of mode keys which permit the user to select characters according to any one of the methods described above with reference to FIGS. 1 to 4. The mode keys are initiated when identified with the light pen 44, by closing the second microswitch 78.

The light pen 44 with its integrated microswitches 77 and 78 is particularly adapted to achieve efficient character selection with the methods of the invention. Whilst it is known to provide switching means within light pens, such switching means serve the function of activating the light pen when required. This is distinct from the two microswitches provided with the light pen 44 of the invention, which actually integrate the light pen 44 with the instruction set controlling the central processing unit 21, in order to perform different options dependent not only on an identified screen area (as with hitherto proposed light pens), but also on which microswitch is operated.

Although a preferred embodiment of the invention has been described with regard to a word-processing system, it will be understood that the method of selecting Chinese script characters according to the invention will find application in any computerized system wherein Chinese text is entered for storage and subsequent processing. Similarly, the method and system for displaying an original document on a display monitor, by digitizing it into bit-map format with a scanning device, are capable of general application.

Moreover, the invention permits Chinese script characters to be entered into a computer system by displaying the input data for selection on a high resolution screen and dispensing with the conventional keyboard. This principle may be extended to any application program (e.g. database, financial spreadsheet, and so on) wherein the data input in the form of numbers, script characters or phrases is entered directly from the screen. Thus, the use of an ultra-high resolution display monitor having a resolution of 1600×1200 pixels, for example, requires only one-third of its display area to be used for the display of input data, leaving two-thirds of its display area free for the concurrent implementation of application programs.

This may be more readily understood with reference, for example, to a computer system for running a financial spreadsheet program. A suitable spreadsheet is displayed within a first portion of the display screen under control of a first program resident in the computer memory. It is assumed that standard data is required to be entered into the spreadsheet under computer control. The data will correspond generally to alphanumeric text data which in hitherto proposed systems is entered by means of a keyboard coupled to the computer.

The proposed method according to the invention obviates the need for such a keyboard, since text data is instead displayed on a second portion of the display screen. The text data is displayed under control of a second program stored in the computer memory. In a preferred embodiment, the text data is organized so that in a first stage display only relatively common options are displayed, less common options being successively displayed under program control until the desired data item appears on the screen.

A specific data item is selected from the second portion of the display screen, by pointing directly to the data item. This can be done with a light pen as described above, or other means may be employed as are known in the art. Mode keys may be displayed for identifying specific groups of data items, which are then displayed for selection.

The data itself may be stored as a structured database in the computer memory so that, by using standard database selection techniques, the specific data then required is displayed within a small number of iterations, by selecting higher order data which point to the required data item. In such an arrangement, a light pen provided with two selection switches may be used, so that identifying a data item with one switch causes it to be selected for input into the application program; whilst identification with the other switch causes lower order data to be displayed.

Furthermore, such an arrangement may be adapted so that the light pen is used not only to select data from the second portion of the display screen but, moreover, to locate its point of insertion into the application program displayed on the first portion of the display screen. This may be achieved by identifying its point of insertion with the light pen and pressing, for example, the first selection switch.

Since, at this point, the position of the light pen corresponds to the first portion of the display screen, it will be understood that a previously selected data item is to be inserted at the specified location. Alternatively, the point of insertion into the second portion of the display screen may first be identified, and the data item then selected from the first portion of the display screen.

I claim:

1. In a computerized system containing a memory, a method for selecting and storing a specific Chinese script character, comprising:
   displaying a first array of characters corresponding to a representative selection of the phonetic units of spoken Chinese,
   whilst said specific character is not displayed:
   selecting from said first array a representative character having the same sound as the specific character,
   identifying all characters having the same sound as said representative character.
   displaying a predetermined number of said identified characters according to a predetermined frequency distribution,
   whilst the specific character is not shown, successively displaying further identified characters according to the predetermined frequency distribution, until the specific character is displayed,
   selecting the specific character, and
   storing said specific in said memory.

2. In a computerized system containing a memory, a method for selecting and storing a specific Chinese script character including a first predetermined sequence of graphic elements each of which is constructed from a respective second sequence of strokes, said method comprising the steps of:
   (a1) displaying a first array of characters corresponding to a representative selection of the phonetic units of spoken Chinese.
   (a2) whilst the sound of said specific character is known:
   (b1) selecting from said first array a representative character having said sound,
   (b2) identifying all characters having the same sound as said representative character, and
   (b3) displaying a predetermined number of said identified characters according to a predetermined frequency distribution;
   (a3) whilst the characters displayed in (b3) do not include said specific character or the sound of the specific character is not known:
   (c1) successively entering strokes into the system according to the second predetermined sequence of respective graphic elements,
   (c2) identifying all characters and graphic elements whose stroke sequences correspond to the entered strokes, and
   (c3) displaying a predetermined number of said identified characters and graphic elements according to respective predetermined frequency distributions;
   (c4) whilst the characters and graphic elements displayed in (c3) do not include either said specific character or its constituent graphics elements according to said first predetermined sequence, repeating steps (c1) to (c3);
   (a5) whilst the characters and graphics elements displayed in (a4) do not include said specific character but do include its constituent graphics elements according to said first predetermined sequence:
(d1) selecting the respective graphic element,
(d2) identifying all characters corresponding to the selected graphic element(s) and identifying successive graphic elements in said first predetermined sequence, and
(d3) displaying a predetermined number of said identified characters and graphic elements according to said respective frequency distributions;
(a6) whilst the characters displayed in (d3) do not include said specific character, repeating from step (a5) until the specific character is displayed;
(a7) selecting the specific character, and
(a8) storing the specific character in the memory.

3. A method according to claim 2, wherein at least one stroke is entered prior to the selection of said representative character, thereby enabling a smaller number of characters to be identified and displayed corresponding to said at least one stroke and said sound.

4. A method according to claim 1 or 2, wherein:
the phonetic units in said first array are arranged in groups, said predetermined number of said identified characters containing characters similar in sound to all the representative characters within a selected one of said groups.

5. A method according to claim 4 wherein said groups may be modified by the user according to specific regional, lingual, dialectical and individual needs.

6. A method according to claim 1 or 2, wherein said first array is arranged as a matrix with a first edge corresponding to the Chinese vowels and a second edge corresponding to the Chinese vowel-consonant combinations, such that a phonetic unit is identified as the intersection of row and column vectors corresponding to a selected consonant and a selected vowel-consonant, respectively.

7. A method according to claim 6, further comprising the steps of:
dividing said first array into a predetermined number of sections;
displaying a predetermined number of geometrical keys each corresponding to a respective one of said sections,
selecting one of said geometrical keys, and
displaying the section of said first array corresponding to the selected geometrical key.

8. A method according to claim 6, further comprising the steps of:
displaying the elements of said first and second edges,
selecting first and second elements from said first and second edges corresponding, respectively, to the consonant and vowel associated with the specific character, and
identified a phonetic element in said first array corresponding to the selected consonant and vowel.

9. In a computerized system containing a memory, a method for selecting and storing and a specific Chinese script character including a first predetermined sequence of graphic elements each of which is constructed from a respective second predetermined sequence of strokes, said method comprising the steps of:
(a1) successively entering strokes into the system according to the second predetermined sequence of respective graphic elements,
(a2) identifying all characters and graphic elements whose stroke sequences correspond to the entered strokes, and
(a3) displaying a predetermined number of said identified characters and graphic elements according to respective predetermined frequency distributions;
(a4) whilst the characters and graphic elements displayed in (a3) do not include either said specific character or the constituent graphic elements according to said first predetermined sequence, repeating steps (a1), (a2) and (a3);
(a5) whilst the characters and graphic elements displayed in (a3) do not include said specific character but do include its constituent graphic elements according to said first predetermined sequence:
(b1) selecting the respective graphic element,
(b2) identifying all characters corresponding to the selected graphic element(s) and identifying successive graphic elements in said first predetermined sequence, and
(b3) displaying a predetermined number of said identified characters and graphic elements according to said respective frequency distributions;
(a6) whilst the characters displayed in (b3) do not include said specific character, repeating from step (a5) until the specific character is displayed;
(a7) selecting the specific character, and
(a8) storing the specific character in the memory.

10. A method according to claim 9, wherein a stroke is entered into said system by:
displaying a representative set of strokes, and
selecting said stroke from said representative set of strokes.

11. A method according to claim 9, wherein a stroke is entered into said system by drawing said stroke for reading by said system.

12. A method according to claim 11 wherein said stroke is drawn within a predetermined area of a raster display monitor associated with said system and having a variable raster scan rate, and
the raster scan rate associated with said predetermined area is increased there y enabling said stroke to be drawn with a higher resolution.

13. A method for selecting a specific word or phrase including a first character which is selected according to claim 1 or 2, comprising the further steps of:
identifying all words and phrases starting with said selected first character,
displaying a redetermined number of said identified words and phrases according to a predetermined frequency distribution,
whilst said specific word or phrase is not displayed, selecting subsequent characters in the word or phrase and repeating the step of identifying and displaying, as required, until the specific word or phrase is displayed,
selecting said specific word or phrase, and
storing the specific word or phrase in the memory.

14. A method according to claim 13, further including the steps of:
displaying a predetermined number of mode keys each corresponding to a respective group of words and phrases,
selecting a mode key, and
identifying only words and phrases which both start with the selected first character and also relate to a group corresponding to the selected mode key.

15. A method for selecting a specific word or phrase including a first character which is selected according to claim 9 or 12, comprising the further steps of:

identifying all words and phrases starting with said selected first character, displaying a predetermined number of said identified words and phrases according to a predetermined frequency distribution, whilst said specific word or phrase is not displayed, successively displaying further identified words and phrases until the specific word or phrase is displayed, selecting said specific word or phrase, and storing the specific word or phrase in the memory.

16. A method according to claim 15, further including the steps of:

displaying a predetermined number of mode keys each corresponding to a respective group of words and phrases, selecting a mode key, and identifying only words and phrases which both start with the selected first character and also relate to a group corresponding to the selected mode key.

17. A method according to any one of claims 1, 9 or 2, herein the predetermined character frequency distribution is dynamically updated as characters are successively selected.

18. In a computerized system containing a memory, a method for selecting and storing a specific Chinese script character including a plurality of graphic elements in a predetermined sequence, said method comprising:

displaying a representative set of graphic elements, selecting a graphic element corresponding to said predetermined sequence, identifying all characters whose graphic element sequence corresponds to said selected graphic element, displaying a first predetermined number of said identified characters according to a predetermined frequency distribution, whilst said first predetermined number of displayed characters does not include said specific character, repeating the cycle of selecting, identifying and displaying a successively smaller predetermined number of characters as required, selecting from said successively smaller predetermined number of displayed characters said specific character, and storing said specific character in said memory.

* * * * *

UNITED STATES PATENT AND TRADEMARK OFFICE
CERTIFICATE OF CORRECTION

PATENT NO. : 4,937,745
DATED : June 26, 1990
INVENTOR(S) : CARMON

It is certified that error appears in the above-identified patent and that said Letters Patent is hereby corrected as shown below:

| | |
|---|---|
| Column 14, line 55 | Delete "RAM", insert therefor -- ROM -- |
| Column 18, line 31 | After "specific", insert -- character -- |
| Column 18, line 68 | Delete "(a4)", insert therefor -- (c3) -- |
| Column 20, line 40 | Delete "there y", insert therefor -- thereby -- |
| Column 20, line 44 | Delete "claim 1 or 2", insert therefor -- claim 9 or 2 -- |
| Column 20, line 68 | Delete "claim 9 or 12", insert therefor -- claim 9 or 2 -- |
| Column 21, line 12 | Delete "claim 15", insert therefor -- claim 13 -- |

UNITED STATES PATENT AND TRADEMARK OFFICE
CERTIFICATE OF CORRECTION

PATENT NO. : 4,937,745

DATED : June 26, 1990

INVENTOR(S) : Carmon

It is certified that error appears in the above-identified patent and that said Letters Patent is hereby corrected as shown below:

Column 21, line 22      Delete "herein", insert therefor --wherein--

Signed and Sealed this

Twenty-second Day of October, 1991

Attest:

HARRY F. MANBECK, JR.

*Attesting Officer*      *Commissioner of Patents and Trademarks*